June 21, 1966 W. A. WEBB 3,256,649
TELESCOPING ARTICULATED COMPOSITE HONEYCOMB
STRUCTURE WITH INFLATABLE EXPANSION MEANS
Filed July 30, 1962 3 Sheets-Sheet 1

INVENTOR.
Wells A. Webb
BY
Townsend and Townsend
attorneys

INVENTOR.
Wells A. Webb
BY
Townsend and Townsend
attorneys

June 21, 1966 W. A. WEBB 3,256,649
TELESCOPING ARTICULATED COMPOSITE HONEYCOMB
STRUCTURE WITH INFLATABLE EXPANSION MEANS
Filed July 30, 1962 3 Sheets-Sheet 3

INVENTOR.
Wells A. Webb
BY
Townsend and Townsend
attorneys

United States Patent Office 3,256,649
Patented June 21, 1966

3,256,649
TELESCOPING ARTICULATED COMPOSITE HONEYCOMB STRUCTURE WITH INFLATABLE EXPANSION MEANS
Wells A. Webb, Berkeley, Calif., assignor to Hexcel Products Inc., Berkeley, Calif.
Filed July 30, 1962, Ser. No. 213,524
7 Claims. (Cl. 52—2)

This invention relates to the art of honeycomb, and more particularly relates to an articulated expansible honeycomb structure.

A principal object of the invention is to provide a composite honeycomb structure composed of two or more sections of expansible honeycomb material which are hingedly joined to one another and are adapted to cooperate in such a manner that the composite structure can be expanded from a relatively folded and compacted condition to an expanded shape of simple or compound curvature.

The particular embodiment of the invention which is illustrated in the drawings and which will hereinafter be described in more detail is shown as comprising at least two sections of expandable honeycomb each of which is composed of a plurality of flexible ribbons or bands of sheet material bonded to one another at spaced intervals and with the bonding points of alternate ribbons staggered relative to one another. Hinge means are provided to attach the sections of honeycomb to one another at their adjoining ribbon ends to permit articulated or hinged movement of said two sections from a relatively folded position to an extended position whereat the said sections of honeycomb define mutual extensions of each other along a predetermined line or path. The arrangement is such that the honeycomb sections when articulated to their extended position can be expanded as a composite structure into the shape of a curved body such as a cylinder, sphere, parabola, ellipsoid, or the like. In the embodiment shown in the drawings, internal pressure generating means, in the form of a pneumatically inflatable bladder, is provided to exert outward pressure against the interior surfaces of the composite structure to cause the same to unfold and expand into its ultimate predetermined curved body shape. As will more fully hereinafter appear, the composite honeycomb structure may also be provided with one or more face skins.

Although the invention is not limited to any particular use or uses to which it may be put, expansible honeycomb structures as described herein have utility in providing compact, inflatable, light weight, transportable building structures, storage containers, self-erecting space vehicles and/or air-borne or water-borne vehicles, and the like.

Other objects, features and advantages of the present invention will become apparent upon reading the following specification and referring to the accompanying drawings in which similar characters of reference represent corresponding parts in each of the several views.

Figure 7:
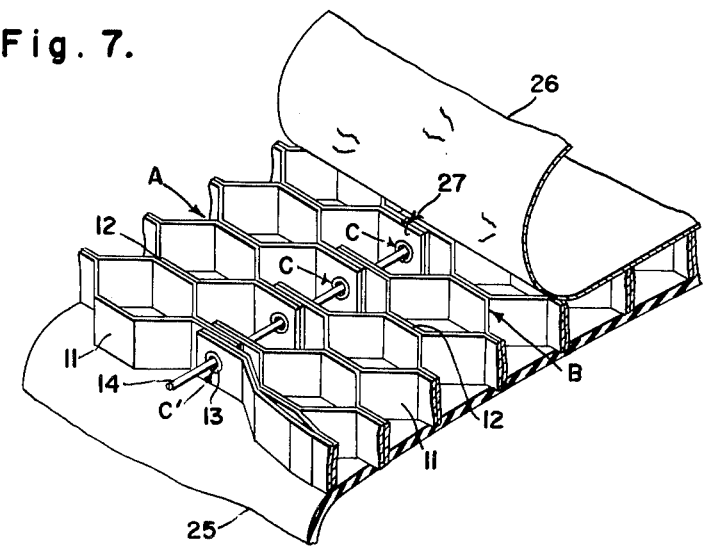
FIG. 7 is a fragmentary perspective view of two sections of honeycomb hingedly attached to one another at their adjoining ribbon ends and showing a restraining cord extending through the hinged joints.

Referring now more specifically to the drawings and particularly to FIG. 7, there is disclosed two honeycomb sections indicated generally at A and B which are hingedly joined together by hinge means indicated generally at C. Each honeycomb section comprises a plurality of ribbons or webs 11 of flat sheet material which are bonded as at 12 to one another at spaced points. As is conventional in the honeycomb art, alternate ribbons or webs 11 are joined to each other in spaced staggered relationship whereby the honeycomb can be expanded from a tightly compacted form to an open cellular form as shown in FIG. 7.

In general the present invention embraces the concept of hingedly joining a plurality of honeycomb sections in such a manner that they may be articulated or moved relative to one another from a generally folded position to an extended position. FIG. 7 shows the two core sections A and B in their extended position which is to say that the two sections constitute mutual extensions or projections of the other along a predetermined line which in the example shown in FIG. 7 constitutes a segment of a compound curvatured body.

Figure 8:
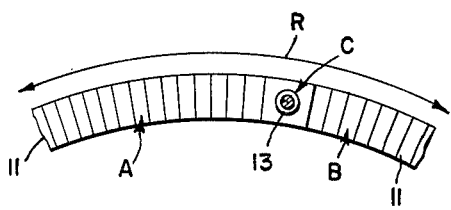
FIG. 8 is a side elevational view of the honeycomb sections of FIG. 7 and showing the curved contour of the honeycomb ribbons.

FIG. 8 is a side view of the honeycomb sections A and B of FIG. 7 and discloses how the ribbon 11 of each section are contoured along their lengths to define one radius of curvature R of the compound curvatured shape which the composite structure defines in fully unfolded and expanded condition.

The hinge means heretofore indicated generally at C in FIG. 7 comprise hollow pivots or grommets 13, although as will be mentioned hereinafter other types of hinge members, including links, can be advantageously employed. In FIG. 7 it is observed that the adjoining ribbon ends of the two sections A and B are hinged together by the pivots 13. FIG. 7 further illustrates the ability to hingedly attach two sections of honeycomb which are composed of a different number of individual ribbons. In this connection honeycomb section A is composed of a greater number of ribbons 11 than is honeycomb section B. Therefore, it is possible to hingedly attach two or more ribbons of one section to a single ribbon of an adjoining section. For purposes of simplicity, FIG. 7 shows one such hinge joint indicated by the reference character C' and wherein it is seen that two ribbon ends of section A are joined by a single hollow pivot or grommet 13 to a single ribbon of section B.

In the fabrication of compound curvatured bodies such as a sphere, for example, and where the ribbon directions of the honeycomb extends from pole to pole, it is necessary to provide a greater number of honeycomb cells around the equator than at either of the poles. Accordingly, it is feasible to fabricate a sphere from articulated sections of honeycomb in which the sections which define the equatorial zone are composed of a substantially greater number of ribbons than the sections which are located closer to the poles. Hence the reason for the desirability of providing a way of hingedly joining two sections of honeycomb composed of an unequal number of individual ribbons.

FIG. 7 further discloses a restraining cord or wire indicated at 14 and the purposes of which will be described hereinafter in reference FIGS. 1–6 inclusive.

Figure 1:
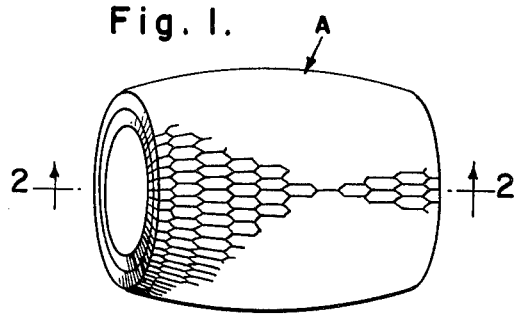
FIG. 1 is a perspective view of an articulated honeycomb structure embodying the invention shown in folded and substantially compacted condition and designed so as to form itself into spherical shape when unfolded and fully expanded.
Figure 2:
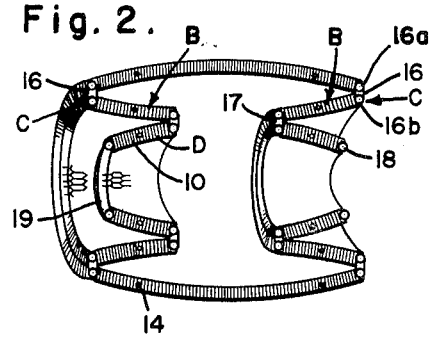
FIG. 2 is a longitudinal sectional view taken on line 2—2 of FIG. 1.
Figure 3:
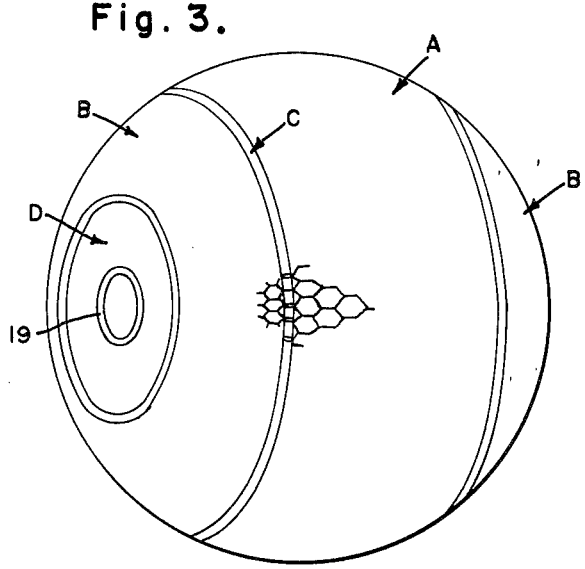
FIG. 3 is an exterior view of the structure of FIG. 1 shown when fully unfolded and expanded spherical shape and showing portions thereof fragmentarily.

FIGS. 1–6 illustrate how the concept of the present invention may be utilized to fabricate a self-expanding spherical shaped honeycomb body. More particularly, FIG. 1 shows the structure in compacted and folded condition and FIG. 3 shows the structure in fully expanded spherical shape. Referring specifically to FIG. 2, the structure is composed essentially of a middle or equatorial annular section A to the opposite ribbon ends of which are hingedly attached intermediate annular sections B by hinge means indicated generally at C and which more specifically comprise connecting links 16. The hinge links 16 function to join the ribbon ends of the adjoining honeycomb sections substantially in the manner shown and described in reference to the hinge connection of FIG. 7, except that each link 16 provides two pivot points 16a and 16b which function to permit the sections B to be folded back in substantially parallel and concentric relationship to section A.

To the outer ribbon ends of honeycomb sections B are hingedly attached annular polar sections D by virtue of hinge links 17. It is seen that each of the honeycomb sections D are folded back in concentric parallel alignment with respect to sections B to which they are hingedly attached. It is thus seen that by virtue of the hinge members 16 and 17 it is possible to fold the various sections of honeycomb A, B and D to an optimum compacted relationship in respect to one another.

The outer ribbon ends of honeycomb section D are pivotally attached as at 18 to a polar flange or ring 19. In the compacted and folded condition of the structure as shown in FIGS. 1 and 2 it will be appreciated that the honeycomb will be unexpanded or, at most, only partially expanded.

Figure 4:
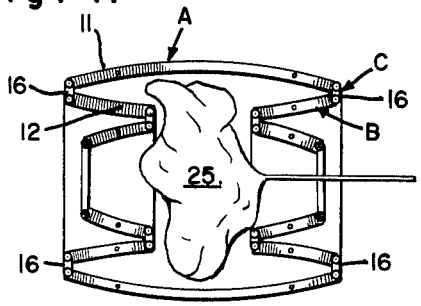
FIGS. 4, 5 and 6 are substantially schematically longitudinal sectional views of the honeycomb structure shown in FIGS. 1–3 and illustrating the progressive operation of the articulated sections and inflatable bladder as the structure is gradually unfolded and expanded to its ultimate spherical shape.
Figure 5:
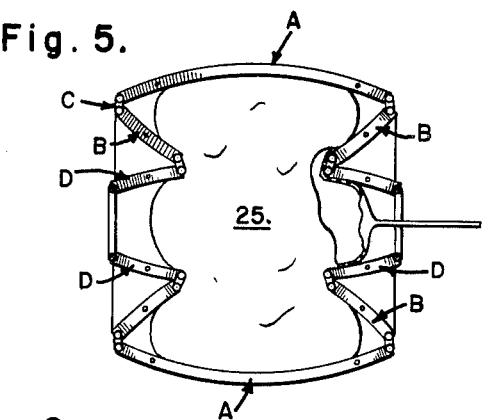
Figure 6:
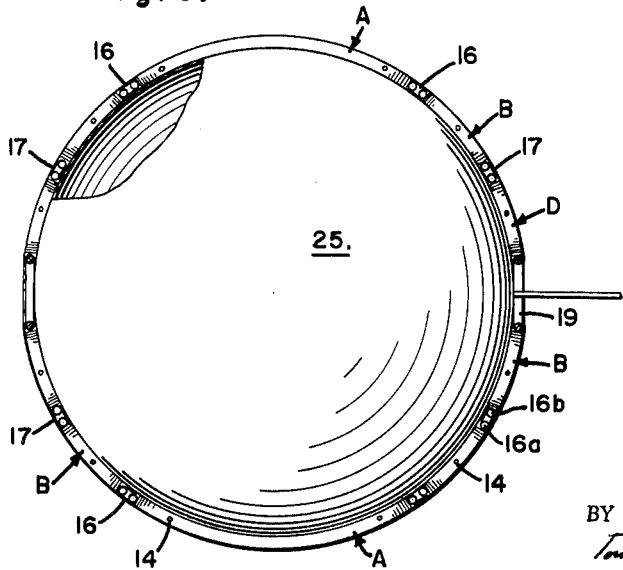

In order to unfold the articulated honeycomb sections A, B and D and to cause the honeycomb to expand to form the spherical shaped body as shown in FIG. 3, it is feasible to provide an inflatable balloon or bladder 25 which is shown in FIGS. 4–6 and connected to a source (not shown) of air or other gas under pressure.

More specifically, FIG. 4 discloses the inflatable bladder 25 in substantially collapsed position. FIG. 5 shows the bladder 25 after it has been partially inflated and after it has distended and enlarged sufficiently to exert pressure against the interior surfaces of the various honeycomb sections in such manner as to cause them to partially enfold. FIG. 6 shows the bladder fully inflated and with all of the articulated honeycomb sections in fully extended positions so as to form the spherical body above mentioned.

In order to control the point or degree of maximum expansion of the honeycomb material under influence of the inflating bladder, one or more restraining cords such as shown at 14 each having a predetermined maximum length or circumference may be threaded through the honeycomb sections. These restraining cords which encircle the entire honeycomb structure at preselected points will absolutely limit the maximum circumference of the honeycomb structure and will thereby function to insure that the structure will expand and inflate to the desired shape and size. Generally speaking, it is preferable to provide the restraining cords at or adjacent the lines of hinged joinder between adjacent honeycomb sections. Thus, in FIG. 7, the restraining cord 14 is shown as being threaded directly through the hollow pivot points or grommets.

Figure 9:
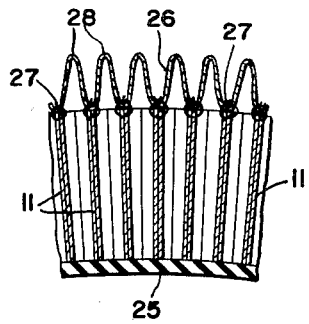
FIG. 9 is a fragmentary sectional view of a honeycomb section in compacted condition with a pliant face skin secured thereto at spaced selected points.

It is of course desirable in most applications to provide the honeycomb body with at least an exterior outer envelope or face skin and in other instances it is desirable to provide the honeycomb body with both inner and outer skins to form a honeycomb sandwich structure. Referring again to FIG. 7, honeycomb sections A and B are shown as being provided with an outer skin 26. One way of attaching the outer skin 26 to the honeycomb is demonstrated in FIG. 9. FIG. 9 discloses an enlarged fragmentary sectional view of a series of partially expanded honeycomb cells with the face skin 26 directly sewn or otherwise attached at spaced selected points 27 to the upper edges of the honeycomb ribbons 11. The unattached portions of the face skin material 26 are formed onto loose folds so as to permit the honeycomb cells to subsequently enlarge when it is expanded into its nominal cell size and at which time the face skin material 26 will be pulled taut so as to tightly overlie the outer surface of the honeycomb. If desired, the interior surface of the face skin can be coated with a pressure sensitive adhesive or other type of adhesive binder that can be activated to adhesively bond the face skin to the honeycomb material. The inflated bladder 25 may itself be utilized to provide an inner face skin for the expanded honeycomb. Once again it is possible to provide a bonding agent between the exterior surfaces of the bladder and the interior surfaces of the honeycomb to adhesively bond the two together.

As an alternate method of unfolding, the outer skin may be inflated to pull out on the honeycomb and thus expand the articulated structure by pulling at points 27. Then the inner bladder may be inflated while gas is being let out of the space between the two skins. Thus, the inner bladder or skin will expand to press against the expanded honeycomb without sliding or other adjustment.

Although the present invention has been described in some detail by way of illustration and example for purposes of clarity of understanding it is understood that certain changes and modifications may be made within the spirit of the invention as limited only by the scope of the claims appended hereto.

What is claimed is:

1. An expansible honeycomb structure formed of plural sections of expansible honeycomb material, each section of which includes a plurality of flexible ribbons bonded to one another at spaced points with the bonding points of alternate ribbons staggered relative to one another, said structure comprising a first honeycomb section in which the ribbons are arranged substantially symmetrically with respect to a central axis and extend substantially radially with respect to the axis and completely therearound in a generally tubular configuration, a pair of second sections in which the ribbons of each said second section are arranged substantially symmetrically with respect to a central axis and extend substantially radially with respect to the axis and completely therearound in a generally tubular configuration, each said second section having a relatively large end and a relatively small end; means for joining the ends of the ribbons at relatively large end of each said second section to the ends of the ribbons of said first section for relative pivotal movement about axes normal to the ribbons, and a pliable fluid impervious bladder disposed interiorly of said sections for pivotally moving said second sections to a position at which said second sections define mutual extensions of said first section and for expanding the same normal to said ribbons in response to inflation of said bladder.

2. The structure of claim 1 including portions of all ribbons of each said section defining holes therethrough normal to said ribbons and a flexible cord transpiercing all holes in each individual section for restraining in a direction normal to the ribbons the expansion of each section.

3. An articulated, expansible honeycomb structure comprising: at least two tubular sections of expandible honeycomb; each section comprising a plurality of flexible ribbons bonded to one another at spaced intervals with the bonding points of alternate ribbons staggered relative to one another; a plurality of hinge means each attaching at least one ribbon of each said two sections of honeycomb to one an other at adjoining ribbon ends for affording relative pivotal movement about an axis substantially normal to said ribbons; said hinge means being operable to permit articulation of said two sections from a relatively folded position to an extended position at which said two sections define mutual extensions of each other; said two honeycomb sections when articulated to said extended position being expansible in a direction normal to said ribbons into the shape of a curved body; and means responsive to fluid pressure for exerting expansive pressure against the interior surfaces of said two honeycomb sections to cause the same to hingedly move about the axis of said hinge means from folded to extended positions, and to cause expansion of the honeycomb sections in a direction normal to the ribbons into the shape of said curved body.

4. The combination of claim 3 and further including an elongate cord extending through said ribbons for limiting the maximum expansion along lines normal to the ribbons of said honeycomb under influence of said internal pressure generating means.

5. The combination of claim 3 and wherein said expansive pressure exerting means comprises a pneumatically inflatable bladder.

6. The combination of claim 3 and wherein said restraining means comprises a flexible restraining cord which is threaded through the ribbons co-axial with at least one said hinge means to limit maximum cell enlargement thereof.

7. The combination of claim 3 and wherein at least one pliable face skin is attached at selected spaced points to the outer surfaces of both said core sections and with said pliant skin gathered in folds between the spaced points when the honeycomb sections are in compacted position, so that the skin resides in taut overlying contacting relationship with respect to the outer surfaces of said honeycomb sections when the latter are articulated and expanded to the shape of said curved body.

References Cited by the Examiner

UNITED STATES PATENTS

| | | | |
|---|---|---|---|
| 255,488 | 3/1882 | Burroughs | 220—6 |
| 353,131 | 11/1886 | Greenwood | 220—19 |
| 657,872 | 9/1900 | Horner | 15—239 |
| 684,822 | 10/1901 | Huckstep | 15—239 |
| 801,176 | 10/1905 | Bowman | 220—6 |
| 941,013 | 11/1909 | Doble et al. | |
| 2,503,811 | 4/1950 | Emigholtz et al. | 220—6 |
| 2,668,327 | 2/1954 | Steele. | |
| 2,880,902 | 4/1959 | Owsen | 220—6 |
| 3,029,910 | 4/1962 | Kirk et al. | 52—629 X |
| 3,071,853 | 1/1963 | Price et al. | 52—615 X |
| 3,104,194 | 9/1963 | Zahorski | 52—474 X |

FRANK L. ABBOTT, *Primary Examiner.*

HENRY C. SUTHERLAND, *Examiner.*

J. L. RIDGILL, *Assistant Examiner.*